United States Patent [19]

McMurtry

[11] 4,158,919
[45] Jun. 26, 1979

[54] APPARATUS FOR MEASURING DISPLACEMENT IN AT LEAST TWO ORTHOGONAL DIMENSIONS

[75] Inventor: David R. McMurtry, Wotton-under-Edge, England

[73] Assignees: Rolls-Royce Limited, London; Renishaw Electrical Limited, Gloucestershire, both of England

[21] Appl. No.: 779,554

[22] Filed: Mar. 21, 1977

[30] Foreign Application Priority Data

Mar. 24, 1976 [GB] United Kingdom ............... 11881/76
Mar. 24, 1976 [GB] United Kingdom ............... 11882/76

[51] Int. Cl.² ........................... G01B 3/22; G01B 5/20
[52] U.S. Cl. ................................. 33/174 L; 33/143 L; 33/149 J
[58] Field of Search ............ 33/174 L, 174 P, 172 E, 33/178 E, 143 L, 149 J

[56] References Cited

U.S. PATENT DOCUMENTS

| 2,583,791 | 1/1952 | Neff | 33/172 E |
| 3,501,943 | 3/1970 | Kelling et al. | 33/174 L |
| 3,520,063 | 7/1970 | Rethwish et al. | 33/174 L |
| 3,534,479 | 10/1970 | Paine | 33/149 J |

FOREIGN PATENT DOCUMENTS

2440692  4/1975  Fed. Rep. of Germany.

Primary Examiner—Richard E. Aegerter
Assistant Examiner—Willis Little
Attorney, Agent, or Firm—Stevens, Davis, Miller & Mosher

[57] ABSTRACT

Measuring apparatus comprises a probe having a stylus supported on a housing by a spring extending in a plane transverse to the axis of the stylus and allowing the stylus to pivot about a center lying on the axis and to move linearly in the direction of the axis. A sensor has fixed and movable parts off-set from the axis, the movable part being connected to the stylus by a transverse arm. The sensor senses both pivotal and axial movement, the pivotal movement corresponding to movement of the work-contacting end of the stylus transverse to the axis. At least one further sensor is provided to sense at least the axial movement of the stylus. An electrical network responsive to both sensor outputs is arranged to discriminate between transverse and axial movements of the stylus. Alternatively the sensors are arranged to give a single output for any movement of the stylus.

8 Claims, 11 Drawing Figures

APPARATUS FOR MEASURING DISPLACEMENT IN AT LEAST TWO ORTHOGONAL DIMENSIONS

This invention relates to apparatus for measuring displacement in at least two orthogonal dimensions.

It is known for such apparatus to comprise a probe having a stylus supported on a housing for pivotal movement in the plane of an axis containing the center of the pivotal movement, a sensor arranged between the stylus and the housing in a position offset from said axis thereby to sense displacement of the work-contacting end of the stylus transversely to said axis.

It is an object of this invention to adapt the known device for the measuring also of displacement in the direction of said axis.

According to this invention there is provided apparatus for measuring displacement in at least two orthogonal dimensions comprising a probe having a stylus connected to a support for pivotal movement in the plane of an axis containing the center of the pivotal movement, a sensor arranged between the stylus and the housing in a position offset from said axis thereby to sense displacement of the work-contacting end of the stylus transversely to said axis, wherein the stylus is also supported on the housing for movement along said axis, and a second transducer is arranged between the stylus and the housing in a position to sense at least the displacement of the stylus in the direction of said axis.

Examples of apparatus according to this invention, including probes and associated electrical systems, will now be described with reference to the accompanying drawings wherein.

Figure 1:
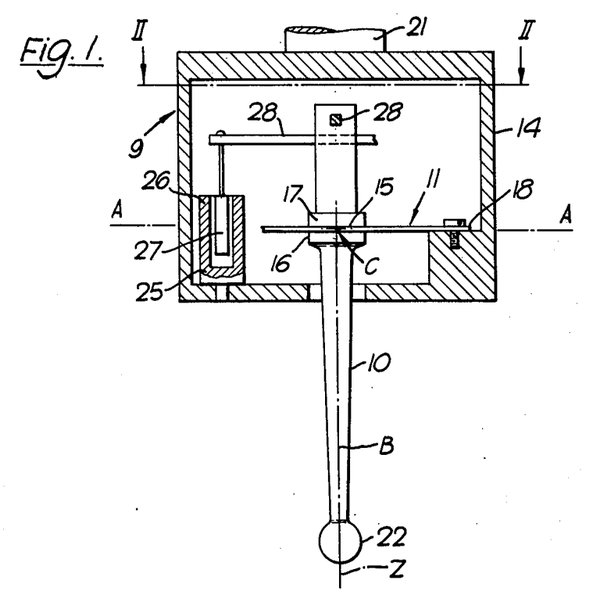
FIG. 1 is a sectional elevation of first example of a probe.
Figure 2:
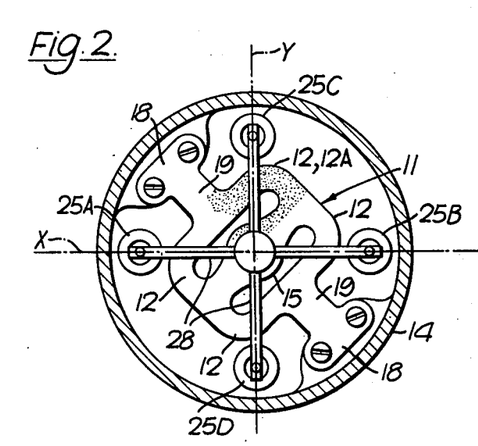
FIG. 2 is a section on the line II—II in FIG. 1.

Referring to FIGS. 1 and 2, a probe 9 comprising a stylus 10 is secured to a spring 11 which has four limbs 12 extending between the stylus and a support member or housing 14. The spring is made of sheet material and extends in a plane A—A perpendicular to the axis of symmetry, denoted B, of the probe. The stylus comprises parts 16,17 extending respectively below and above a central part 15 of the spring 11, the parts 16,17 being screwed one into the other to grip the part 15 between them. The limbs 12 have between them two mounting flanges 18 whereby the spring is secured to the housing 14.

The basic shape of each limb 12 is shown shaded at 12A in FIG. 2 from which it is clear that the limb extends curvedly, generally in the shape of the letter "U," between the central part 15 and a said flange 18. The spring shape includes, at each limb, a part 19 providing a connection between the limb and the flange 18.

The housing 14 has an arbor 21 for attachment to the operating head of a co-ordinate measuring machine (known per se and not illustrated) wherein the head is supported by respective linear carriages for movement in three dimensions indicated as X, Y, Z in FIGS. 1 and 2. The carriages are connected to measuring devices for the continuous monitoring of the head position relative to a given datum. In operation, the head is moved relative to a workpiece until a spherical end 22 of the stylus touches a face of the workpiece. Any movement of the head beyond the point of touch results in displacement of the stylus relative to the head, and such displacement is used for determining the position of said face of the workpiece relative to a datum in the measuring machine.

When the spring 11 is free, i.e. when there is no force, other than gravity, acting on the end 22 of the stylus, the stylus is said to be in the rest position. A said displacement of the stylus i.e. of the end 22, is accommodated by deflection of the spring involving bending or twisting of the limbs 12. During displacement in the X and Y direction the stylus pivots about the center, denoted C, of the spring and during Z displacement the center C travels along the axis B. Parallel motion of the stylus in the X or Y direction is avoided by the limbs 12 having a substantially greater extent in the plane A—A than the thickness of the spring sheet material so that while the limbs can bend or twist they can resist forces lying in the plane A—A itself.

Displacement of the stylus is measured by four sensing transducers 25A,25B,25C,25D arranged on a common pitch circle about the axis B and on two diameters lying respectively in the X and Y directions (FIG. 2). Each transducer comprises induction windings 26 and a movable core 27 such that the inductions of the windings vary in accordance with a change in core position. Such transducers are known per se. Each core 27 is connected by a flexible wire to a respective arm 28 secured to the stylus.

Each transducer 25 is connected to an induction bridge 30 (FIG. 3) for producing an output which is positive, negative or zero according to the balance of the bridge. The outputs of the four bridges are denoted 29A,29B,29C,29D respectively. The transducers are so positioned and the bridges so adjusted that all transducer outputs are zero when the stylus is at rest. The bridge outputs 29A,29B are connected, one through an inverter 31, to a summing amplifier 32 for forming the difference 29A-29B. It will be clear that, since during movement of the stylus in the X direction the outputs 29A,29B become respectively positive and negative, the amplifier output is a signal 33 proportional to X displacement of the stylus and has a sign indicative of the sense of direction away from the rest position.

Figure 3:
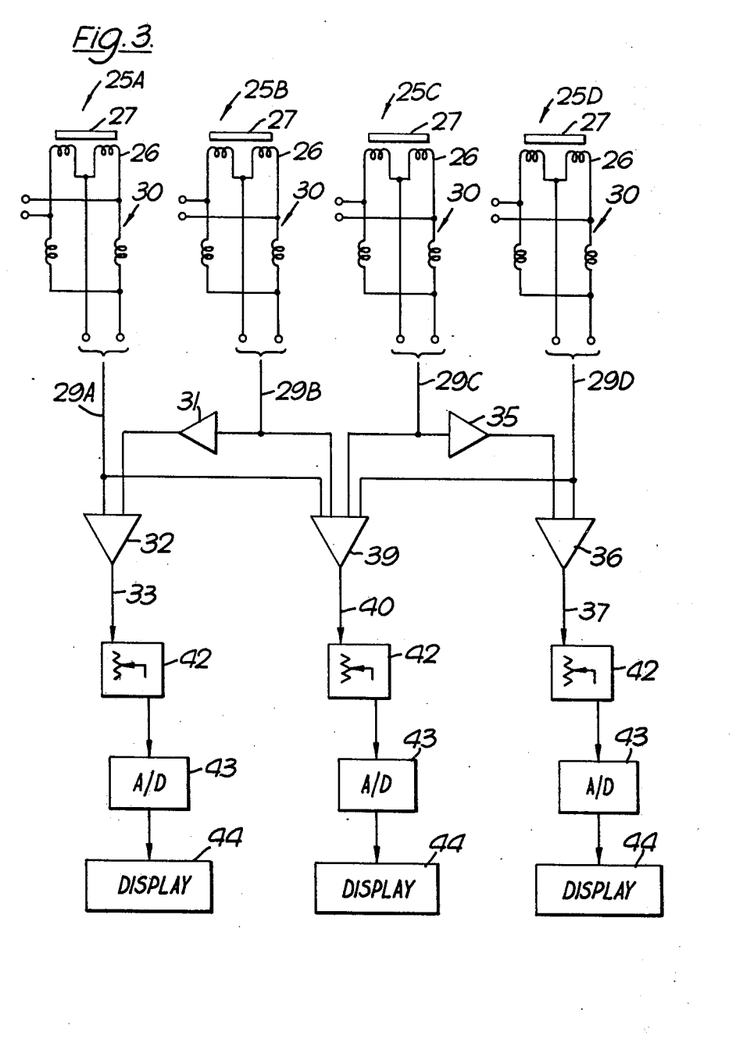
FIG. 3 is a diagram of an electrical system connected to the probe shown in FIGS. 1 and 2.

The bridge outputs 29C,29D are connected through an inverter 35 to a summing amplifier 36 to produce a signal 37 proportional to Y displacement of the stylus.

Further, all the bridge outputs 29A,29B,29C,29D are connected to a summing amplifier 39 whose output 40 is therefore proportional to Z displacement of the stylus and has a sign corresponding to the sense of the Z displacement. Thus, Z displacement is sensed by the same transducers as X and Y displacement without loss of discrimination between the three dimensions.

If the stylus is moved such that there are component movements in two or three dimensions the respective amplifier outputs show these components separately.

The outputs 33,37,40 are each connected to a respective calibrating potentiometer 42, analog to digital converter 43, and digital display units 44. The separate potentiometer are necessary because the outputs 33,37 are not to the same scale as the output 40, the relationship being as 2:4, due to amplifiers 32,36 each having two unit inputs while the amplifier 40 has four unit inputs.

In a modification, not illustrated, only one output of each pair of transducers is used for determining the Z dimension. For example, the outputs 29A and 29B only may be connected to the summing amplifier 39. This will generate a true Z reading though possibly not to as high an accuracy as in the case of using both outputs of each pair of transducers.

Figure 4:
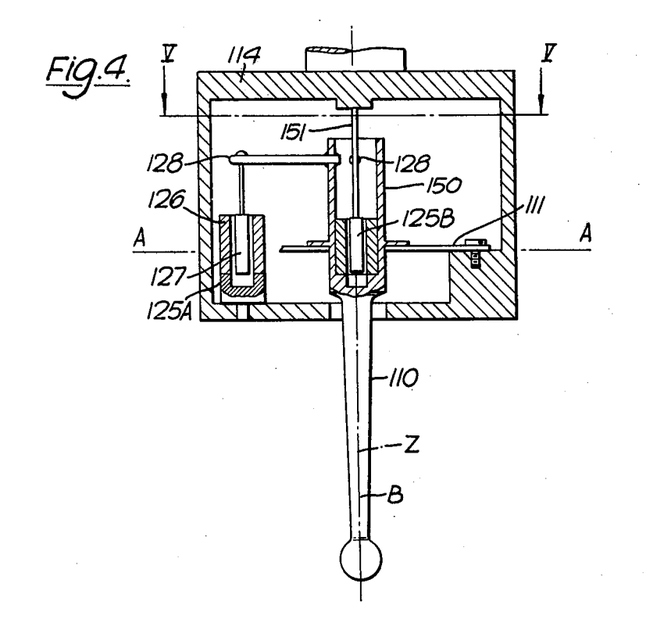
FIG. 4 is a sectional elevation of a second example of a probe.
Figure 5:
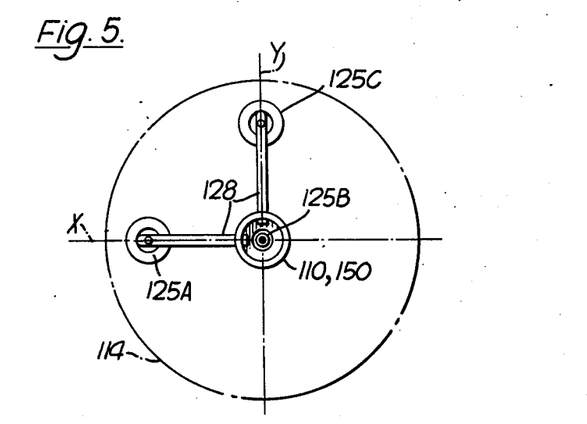
FIG. 5 is a section on the line V—V in FIG. 4.

The probe shown in FIGS. 4,5 has a stylus 110 secured to a spring 111 supported in a housing 114. The arrangement of the stylus, spring and housing is generally the same as in FIGS. 1 and 2, the spring being arranged in a plane A—A and permitting displacement of the stylus from a rest position in the X, Y and Z directions, the Z direction being that of the axis of symmetry B of the probe. Displacement of the stylus is measured by three sensing transducers 125A,125B,125C each having induction windings 126 and a movable core 127. Two of the transducers, 125A and 125C are situated in positions offset from the axis B respectively in the X and Y directions the windings and cores being secured by rods to the housing 114 and stylus 110 respectively. The third transducer 125B is situated on the axis B in a hollow part 150 of the stylus and its winding is secured to the latter part while the core is secured to the housing 114 by a wire 151.

The transducers 125 are connected to respective induction bridges 130A,130B,130C (FIG. 6) having outputs 129A,129B,129C respectively. The outputs 129A,129B are connected, one through an inverter 131, to a summing amplifier 132 which, accordingly, has an output 133 proportional to displacement of the stylus in the X direction. The outputs 129B,129C are connected, one through an inverter 135 to a summing amplifier 136 which, accordingly, has an output 137 proportional to displacement of the stylus in the Y direction. It will be clear that as far as the measurement of the X and Y dimensions are concerned the output 129B plays no part unless there is also a displacement in the Z direction. In the latter case the connections through the inverters 131,135 ensure that the Z displacement does not falsify the measurement in the X or Y dimension.

Figure 6:
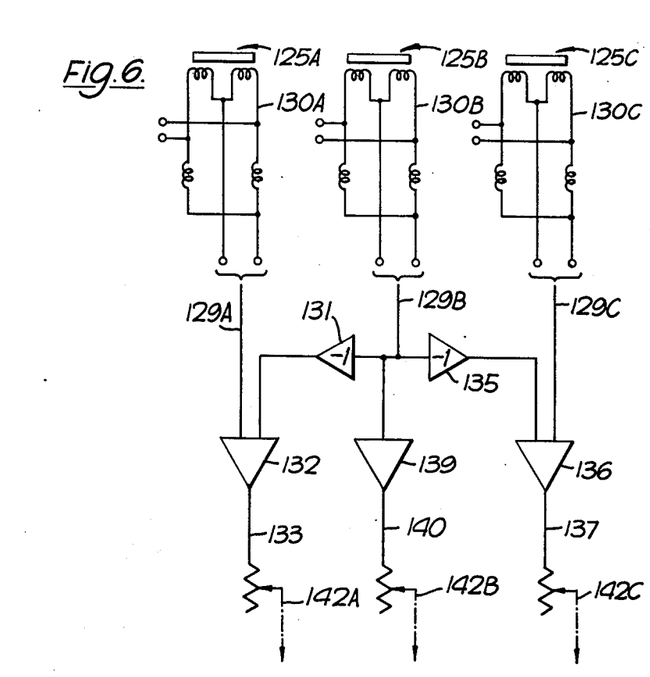
FIG. 6 is a diagram of an electrical system connected to the probe shown in FIGS. 4 and 5.

The output 129B itself is proportional to displacement in the Z direction and is simply connected to an amplifier 139 having an output 140.

The three outputs 133,137,140 are taken through respective potentiometers 142A, 142B and 142D for calibration into 1:1 correspondence with the respective stylus displacements.

Figure 7:
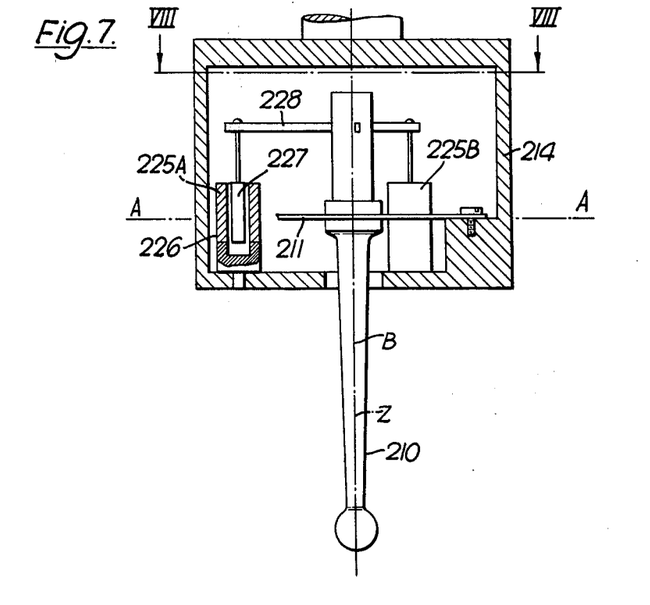
FIG. 7 is a third example of a probe.
Figure 8:
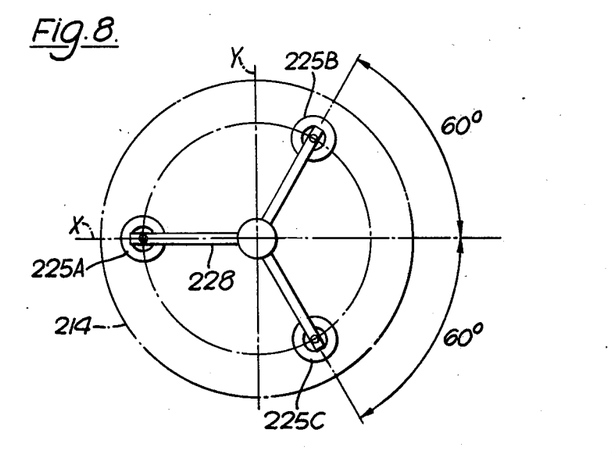
FIG. 8 is a section on the line VIII—VIII in FIG. 7.

The probe shown in FIGS. 7,8 has a stylus 210 secured to a spring 211 supported in a housing 214. The arrangement of the stylus, spring and housing is generally the same as in FIGS. 1,2, the spring being arranged in a plane A—A and permitting displacement of the stylus from a rest position in the X, Y and Z directions, the Z direction being that of the axis of symmetry B of the probe. Displacement of the stylus is measured by three sensing transducers 225A,225B,225C each having induction windings 226 and a movable core 227. The transducers are situated in equispaced relationship on a common pitch circle centered on the axis B. The transducer 225A is situated on a radius extending in the X direction. The transducers 225B,225C are situated on respective radii each forming an angle of 60° with the X direction and lie on a line parallel to the Y direction. The windings 226 of the transducers are secured to the housing 214 and the cores 227 are secured to the stylus by respective rods 228.

The transducers 225A,225B,225C are connected to respective induction bridges 230A,230B,230C (FIG. 9) having outputs 229A,229B,229C respectively.

Figure 9:
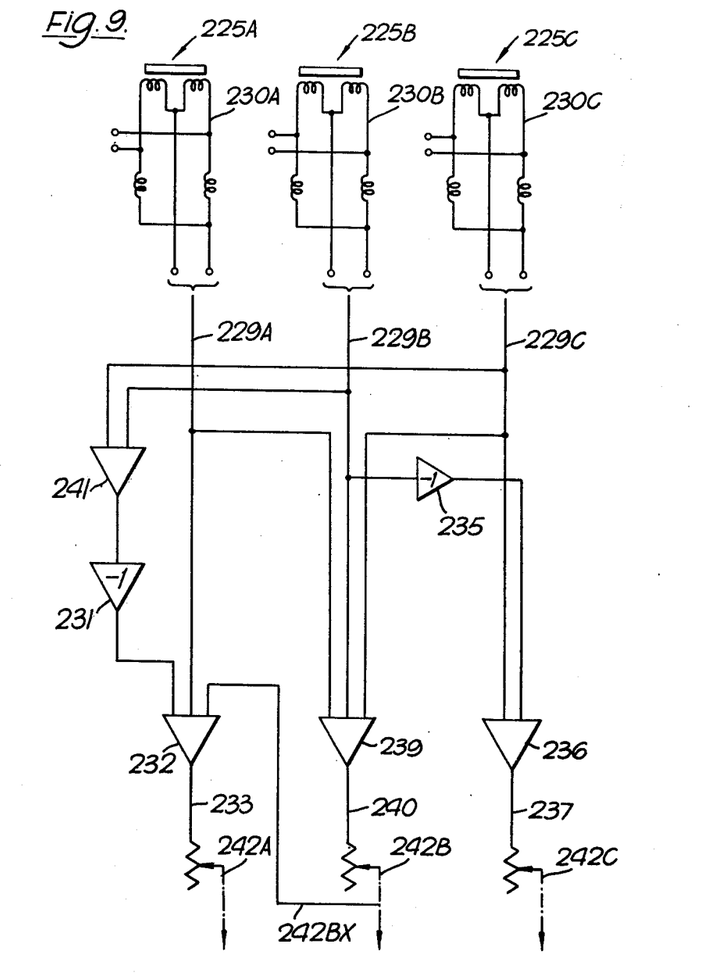
FIG. 9 is a diagram of an electrical system connected to the probe shown in FIGS. 7 and 8.

During displacement of the stylus in the X direction the output 229A becomes positive while the two outputs 229B and 229C become both negative, or vice versa. However, in view of the 60° angle of the arms 228B,228C the outputs of the transducers 225B and 225C are each one half of the output of the transducer 225A. To measure movement in the X direction the outputs 229B,229C are connected to a summing amplifier 241 whose output is passed through an inverter 231 whose output is in turn passed together with the output 229A to a summing amplifier 232 having an output 233 given by the difference:

$$233 = 229A - (-229B + (-229C)) = 229A + 229B + 229C$$

which is proportional to the displacement of the stylus in the X direction. Assuming the magnitude of the signal 229A during an X displacement to be unity, them having regard to the signals 229B,229C each being one half unit, the signal 233 has a magnitude of two said units.

During movement of the stylus in the Y direction the transducer 225A is unaffected while the transducers 225B,225C produce outputs which are equal and opposite. Due to the 60° angle of the arms 228B,228C the latter outputs are each proportional to 0.866 of unity. To measure the movement in the Y direction one of the bridge outputs 229B,229C is taken through an inverter 235 which output is connected together with the other bridge output to a summing amplifier 236 having an output 237 given by the difference:

$$237 = 229B = (-229C) = 229B + 229C$$

which is proportional to the stylus displacement in the Y direction. This signal has a magnitude of $2 \times 0.866 = 1.732$ units During movement of the stylus in the Z direction all three transducers 225A,225B,225C having the same magnitude and sign of output. To measure the movement, the outputs 229A,229B,229C are connected to a summing amplifier 239 whose output 240 is proportional to the stylus movement in the Z direction and has a magnitude of three said units.

The three outputs 233,237,240 are taken through respective potentiometers 242A,242B,242C for calibration into 1:1 correspondence with the respective stylus displacements, i.e. to have the same output for unit displacement. Thus potentiometer 242A is set to divide the signal 233 by 2, the potentiometer 242C is set to divide the signal 237 by 1.732, and the potentiometer 242B is set to divide the signal 240 by 3.

The output from the potentiometer 242B has a branch 242BX led as an input into the summing amplifier 232 in order to remove the effect of any Z displacement from the signal 232. The signal 237 does not require similar treatment because the effect of any Z displacement is cancelled by the inverter 235.

Figure 10:
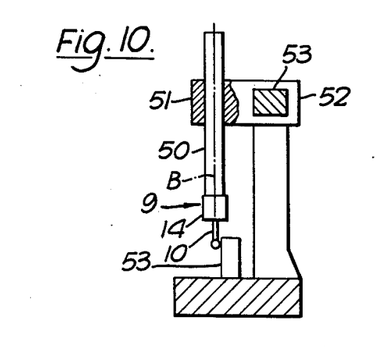
FIG. 10 is a sectional elevation of a machine supporting a probe for movement.

FIG. 10 shows a probe e.g. the probe 9 of FIG. 1 connected to a slide 50 supported in a guide 51 for movement in the direction of the axis B, the guide 51 itself comprising a carriage 52 supported for movement along a guide 53 in a direction transverse to the axis B. The arrangement constitutes a machine supporting the probe for movement relative to a workpiece 53 to be measured.

Figure 11:
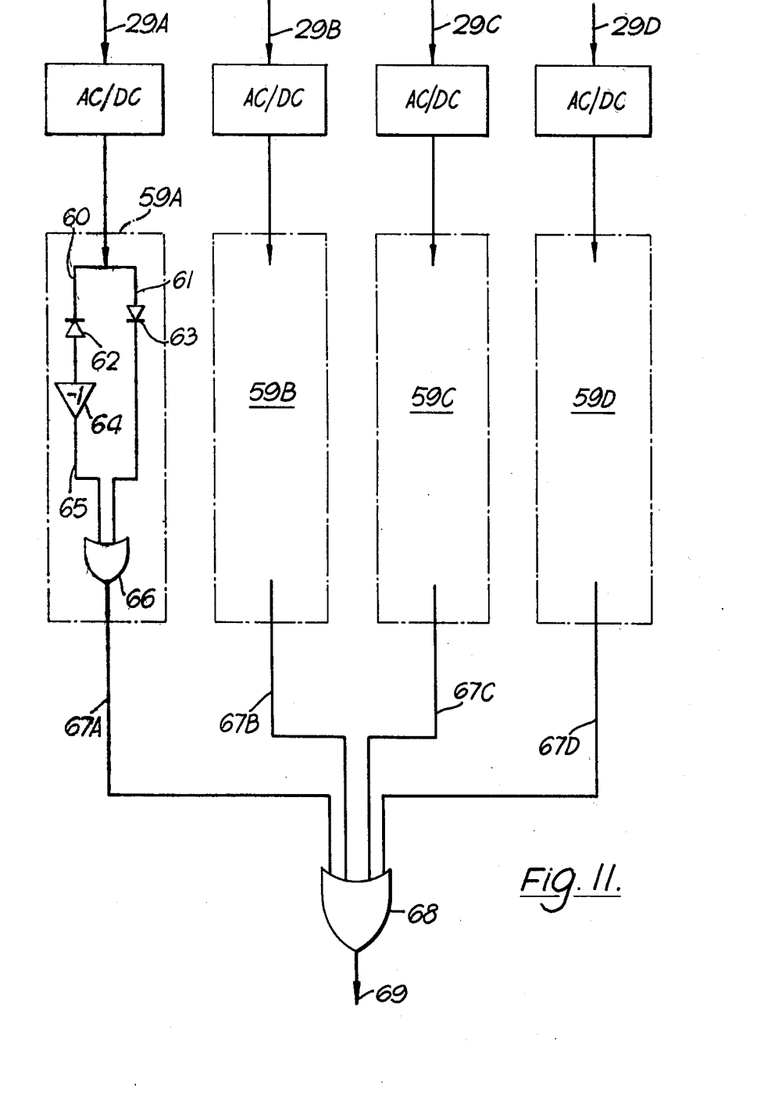
FIG. 11 is a modification of the system shown in FIG. 3.

In any one of the examples shown the outputs of the induction bridges may be taken through a network which provides a single output of uniform polarity so that a single, say, positive signal is produced so long as at least one of the bridges has an output and regardless of whether that output is positive or negative. For example the signal 29A of FIG. 3 may be taken through a polarizing network 59A (FIG. 11) wherein the signal 29A is divided into branches 60,61 each having respective oppositely diodes 62,63. The branch 60 is taken through an inverter 64 to produce a signal 65. The signals 61,65 are taken through an OR gate 66 to produce a single signal 67A which is positive regardless of the sign of the signal 29A. Similar networks 59C,59D are provided for the signals 29B,29C,29D to produce outputs 67B,67C,67D which are taken through an OR gate 68 to produce a single output signal 69.

I claim:

1. Apparatus for measuring displacement in at least two orthogonal dimensions comprising
   a support,
   a stylus connected to said support for displacement from a rest position pivotally about a center and linearly along an axis containing said center,
   a first and a second sensor each having a first component secured to the support and a second component secured to the stylus,
   said second components being movable relative to the respective first components in the direction of said axis when the stylus is displaced axially,
   said first sensor being offset from said axis whereby said second component of said second sensor is moved axially also when said stylus is moved pivotally,
   said first and second sensors having outputs which are zero when said stylus is in said rest position;
   the outputs of each said sensor being of opposite sign with respect to displacement of said stylus pivotally from said rest position,
   the respective outputs of said first and second sensors being of opposite sign when said stylus is displaced axially from said rest position,
   means for adding the output of said second sensor to the output of said first sensor whereby during axial displacement of said stylus the output of said second sensor, being of opposite sign, is cancelled from the output of said first sensor and the outputs of said first and second sensors are discreet indications of said pivotal and linear displacements, respectively.

2. Apparatus according to claim 1 wherein both said first and second sensors are offset from said axis and are situated at opposite sides of said axis in a common plane therewith.

3. Apparatus according to claim 1 wherein said second sensor is situated on said axis.

4. Apparatus according to claim 1 comprising a third sensor, wherein said three sensors are situated symmetrically about said axis.

5. Apparatus according to claim 1 wherein the support of said stylus on said housing is by means of a spring extending primarily in a plane containing the center of said pivotal movement and being perpendicular to said axis, said spring having at least one portion connected between said stylus and said housing and extending curvedly in said plane thereby to accommodate the axial and pivotal displacement of said stylus.

6. Apparatus according to claim 1 wherein said stylus is connected to a slide supported in a first guide for movement in the direction of said axis, said first guide itself comprising a carriage supported for movement along a second guide in a direction transverse to said axis.

7. Apparatus according to claim 4 wherein said three sensors each have outputs of opposite sign with respect to displacement of said stylus to opposite sides of said rest position, and the outputs of said three sensors are connected to a means for forming a signal defining the algebraic difference between one of the outputs, the sum of the second and third outputs, and one third of the sum of the three outputs.

8. Apparatus according to claim 1 comprising a first pair of said sensors arranged to sense pivoting of said stylus in a first plane including said axis and a second pair of said sensors arranged to sense pivoting of said stylus in a second plane including said axis and perpendicular to said first plane, each sensor having outputs of opposite sign with respect to displacement of said stylus to opposite sides of said rest position, wherein the outputs of each of said pair of sensors are connected to a means for inverting one of the outputs of the pair, and all of the inverted and non-inverted outputs are gated to a single output, thereby to make available a signal output of the same polarity from any one of the outputs of the respective pairs.

* * * * *